United States Patent
Nataraj et al.

(10) Patent No.: US 9,531,614 B1
(45) Date of Patent: Dec. 27, 2016

(54) NETWORK AWARE DISTRIBUTED BUSINESS TRANSACTION ANOMALY DETECTION

(71) Applicant: AppDynamics, Inc., San Francisco, CA (US)

(72) Inventors: Harish Nataraj, Berkeley, CA (US); Ajay Chandel, Fremont, CA (US); Prakash Kaligotla, San Francisco, CA (US); Naveen Kondapalli, San Ramon, CA (US)

(73) Assignee: AppDynamics, Inc., San Francisco, CA (US)

(*) Notice: Subject to any disclaimer, the term of this patent is extended or adjusted under 35 U.S.C. 154(b) by 0 days.

(21) Appl. No.: 14/928,982

(22) Filed: Oct. 30, 2015

(51) Int. Cl.
*G06F 15/16* (2006.01)
*H04L 12/26* (2006.01)
*H04L 29/08* (2006.01)
*G06F 12/00* (2006.01)

(52) U.S. Cl.
CPC ..... *H04L 43/0876* (2013.01); *H04L 29/08072* (2013.01); *H04L 43/062* (2013.01)

(58) Field of Classification Search
USPC ................. 709/203, 223–229, 250
See application file for complete search history.

(56) References Cited

U.S. PATENT DOCUMENTS

| | | | | |
|---|---|---|---|---|
| 2013/0326055 A1* | 12/2013 | Chatterjee | ............... | H04L 43/04 709/224 |
| 2013/0340079 A1* | 12/2013 | Gottlieb | .............. | H04L 63/1416 726/23 |
| 2014/0068069 A1* | 3/2014 | Bansal | .................. | H04L 43/022 709/224 |
| 2015/0074258 A1* | 3/2015 | Ferreira | .............. | H04L 43/0876 709/224 |
| 2015/0229661 A1* | 8/2015 | Balabine | ................. | H04L 43/04 726/22 |
| 2015/0244594 A1* | 8/2015 | Kay | ....................... | H04L 43/045 370/252 |
| 2016/0080230 A1* | 3/2016 | Anand | .................... | H04L 45/02 709/224 |

* cited by examiner

*Primary Examiner* — Zarni Maung
(74) *Attorney, Agent, or Firm* — Bachmann Law Group

(57) ABSTRACT

A system monitors applications and network flows used during the business transaction to determine distributed business transaction anomalies caused at least in part by network performance issues. A network flow associated with a business transaction is monitored by a network agent. The network agent may capture packets, analyze the packets and other network data to determine one or more baselines, and dynamically compare subsequent network flow performance to those baselines to determine an anomaly. When an anomaly in a network flow is detected, this information may be provided to a user along with other data regarding a business transaction that is utilizing the network flow. Concurrently with the network agent monitoring, application agents may monitor one or more applications performing the business transaction. The present system reports performance data for a business transaction in terms of application performance and network performance, all in the context of a distributed business transaction.

23 Claims, 9 Drawing Sheets

US 9,531,614 B1

NETWORK AWARE DISTRIBUTED BUSINESS TRANSACTION ANOMALY DETECTION

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Most application monitoring tools provide a standard report regarding application performance. Though the typical report may be helpful for most users, it may not provide the particular information that an administrator wants to know.

For example, when monitoring a web application, is important to provide as much detail as possible to a system administrator in order to correctly diagnose a problem. In many cases, a performance issue with an application is not due to the application itself, but rather due to a network that processes communications between multiple machines. It is difficult to determine how an application performance is affected by the network when only monitoring the application itself. What is needed is an improved system for monitoring applications that communicate over network.

SUMMARY

The present technology, roughly described, monitors applications as well as the network flows used during the business transaction to determine distributed business transaction anomalies caused at least in part by network performance issues. A network flow associated with a business transaction is monitored by a network agent. The network agent may capture packets, analyze the packets and other network data to determine one or more baselines, and dynamically compare subsequent network flow performance to those baselines to determine an anomaly. When an anomaly in a network flow is detected, this information may be provided to a user along with other data regarding a business transaction that is utilizing the network flow. Concurrently with the network agent monitoring, application agents may monitor one or more applications performing the business transaction. The present system reports performance data for a business transaction in terms of application performance and network performance, all in the context of a distributed business transaction. This provides a detailed and informative picture to an administrator as to what is causing poor performance, with respect to applications and network flows used by business transaction, and how application performance depends on performance of a network flow.

An embodiment may include a method for monitoring a business transaction performed. The method begins with monitoring a distributed business transaction over a plurality of machines and at least one network. Network flow data associated with an anomaly for the distributed business transaction may be collected. The network flow data associated with the anomaly and the distributed business transaction may be reported to a remote server.

An embodiment may include a system for monitoring a business transaction. The system may include a processor, memory, and one or more modules stored in memory and executable by the processor. When executed, the modules may monitor a distributed business transaction over a plurality of machines and at least one network, collect network flow data associated with an anomaly for the distributed business transaction, and report the network flow data associated with the anomaly and the distributed business transaction to a remote server.

DETAILED DESCRIPTION

The present technology monitors applications as well as the network flows used during the business transaction to determine distributed business transaction anomalies caused at least in part by network performance issues. A network flow associated with a business transaction is monitored by a network agent. The network agent may capture packets, analyze the packets and other network data to determine one or more baselines, and dynamically compare subsequent network flow performance to those baselines to determine an anomaly. When an anomaly in a network flow is detected, this information may be provided to a user along with other data regarding a business transaction that is utilizing the network flow. Concurrently with the network agent monitoring, application agents may monitor one or more applications performing the business transaction. The present system reports performance data for a business transaction in terms of application performance and network performance, all in the context of a distributed business transaction. This provides a detailed and informative picture to an administrator as to what is causing poor performance, with respect to applications and network flows used by business transaction, and how application performance depends on performance of a network flow.

Figure 1:
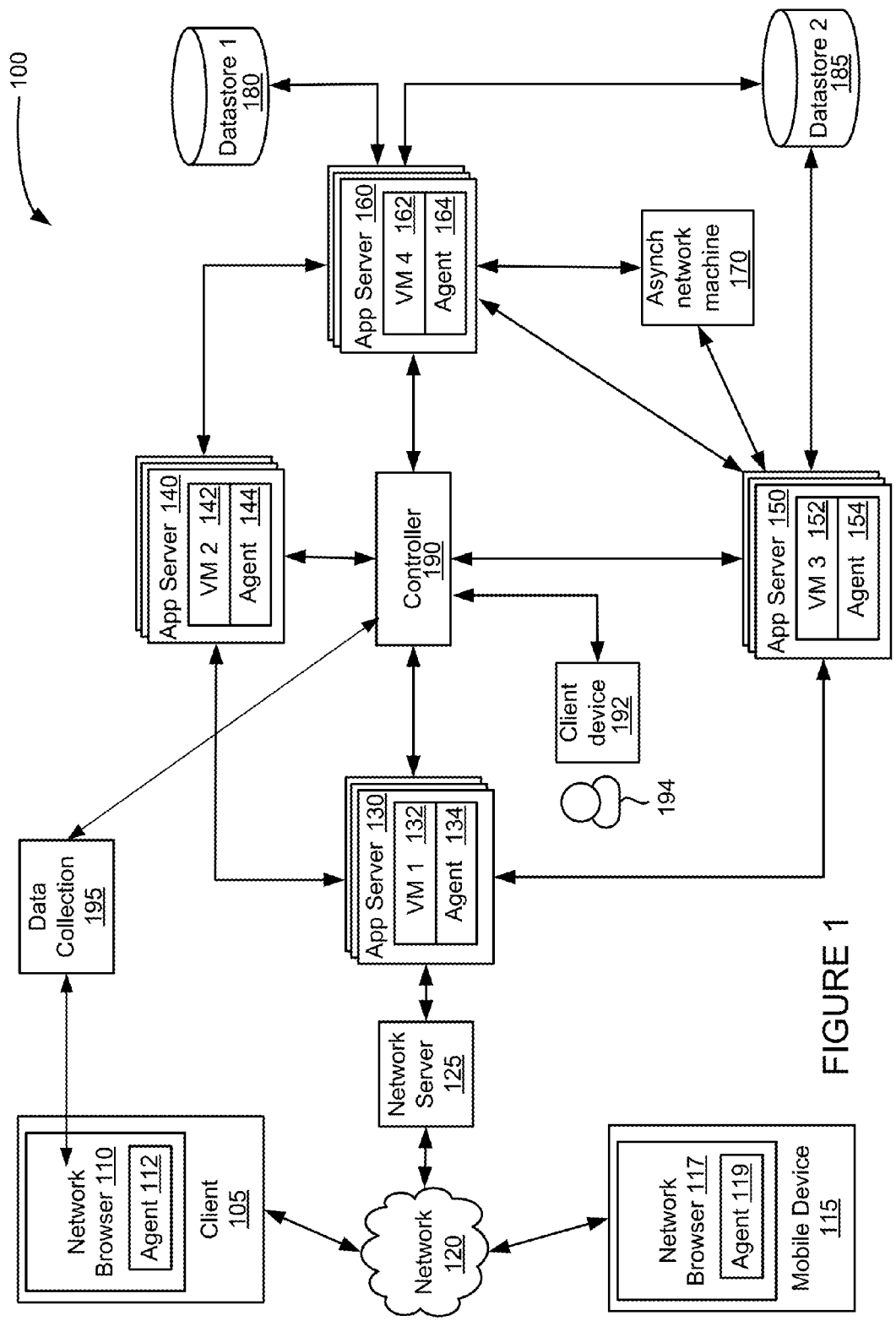
FIG. 1 is a block diagram of a system for monitoring a distributed business transaction performed by applications and at least one network flow.

FIG. 1 is a block diagram of a system for monitoring a distributed business transaction. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Mobile device may also include client applications and other code that may be monitored by agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130 or one or more separate machines. When network 120 is the Internet, network server 125 may be implemented as a web server.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as including a Java, PHP, .Net, and Node.JS, be implemented as a Java virtual machine, or include some other host type. Application server 130 may also include one or more agents 134 (i.e. "modules"), including an application agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, server 130 may include Java code, .Net code, PHP code, Ruby code, C code or other code to implement applications and process requests received from a remote source.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .Net, or C program), machine resources, network layer data, and communicate with byte instrumented code on application server 130 and one or more applications on application server 130.

Each of agents 134, 144, 154 and 164 may include one or more agents, such as an application agents, machine agents, and network agents. An application agent may be a type of agent that is suitable to run on a particular host. Examples of application agents include a JAVA agent, .Net agent, PHP agent, and other agents. The machine agent may collect data from a particular machine on which it is installed. A network agent may capture network information, such as data collected from a socket. Agents are discussed in more detail below with respect to FIG. 2.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

An application agent may be an agent suitable to instrument or modify, collect data from, and reside on a host. The host may be a Java, PHP, .Net, Node.JS, or other type of platform. Application agent 220 may collect flow data as well as data associated with the execution of a particular application. The application agent may instrument the lowest level of the application to gather the flow data. The flow data may indicate which tier is communicating which with which tier and on which port. In some instances, the flow data collected from the application agent includes a source IP, a source port, a destination IP, and a destination port. The application agent may report the application data and call chain data to a controller. The application agent may report the collected flow data associated with a particular application to network agent 230.

A network agent may be a standalone agent that resides on the host and collects network flow group data. The network flow group data may include a source IP, destination port, destination IP, and protocol information for network flow received by an application on which network agent 230 is installed. The network agent 230 may collect data by intercepting and performing packet capture on packets coming in from a one or more sockets. The network agent may receive flow data from an application agent that is associated with applications to be monitored. For flows in the flow group data that match flow data provided by the application agent, the network agent rolls up the flow data to determine metrics such as TCP throughput, TCP loss, latency and bandwidth. The network agent may then reports the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the application agent, network agent, and machine agent may report data to the controller. Controller 210 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as a content page, e.g., a web page, which may be provided to and rendered through a network browser application on client device 192.

Applications 132, 142, 152 and 162 may be any of several types of applications. Examples of applications that may implement applications 132-162 include a Java, PHP, .Net, Node.JS, and other applications.

Figure 2:
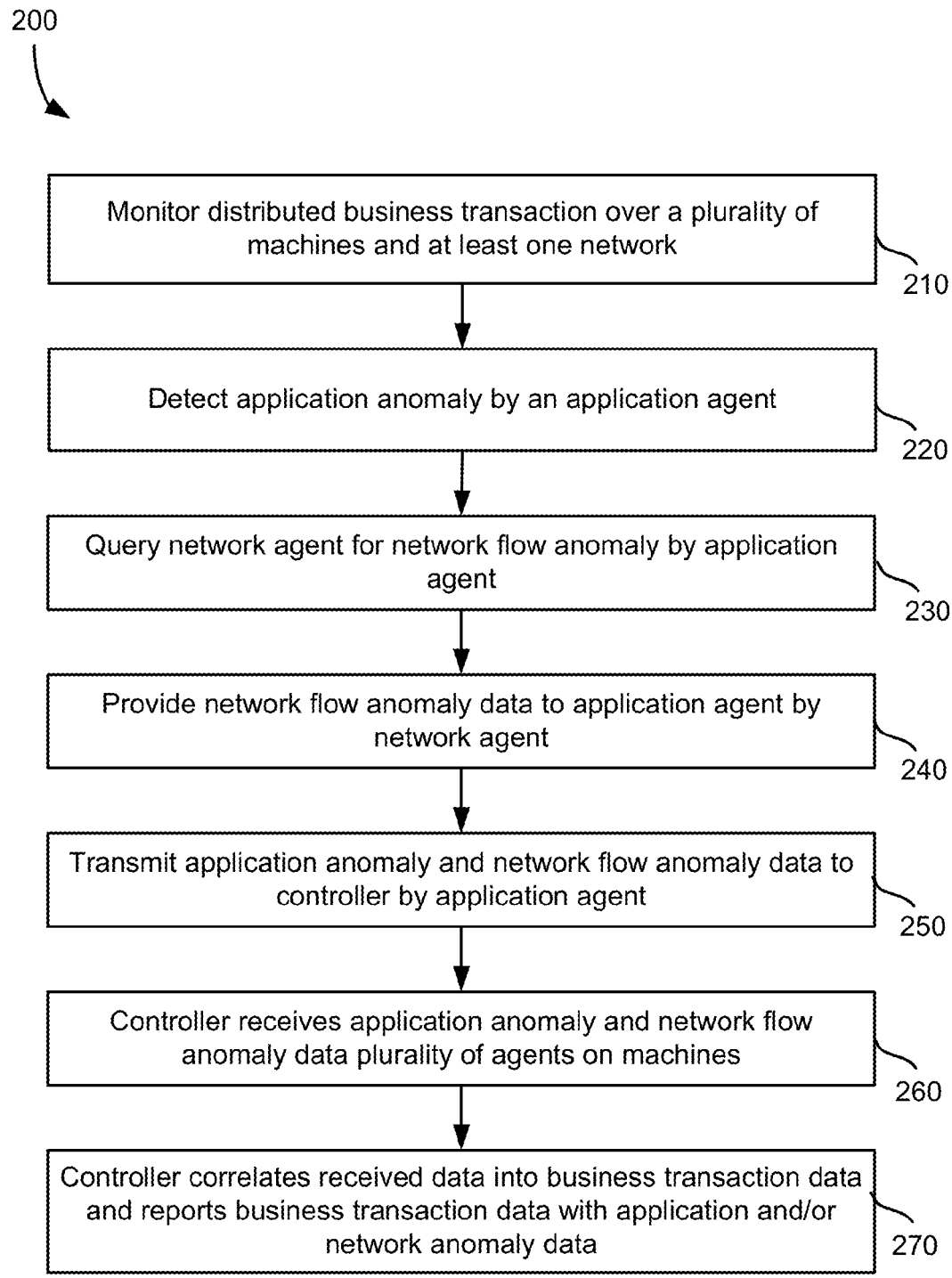
FIG. 2 is a method for monitoring a business transaction application and network flow.

FIG. 2 is a method for monitoring a business transaction application and network flow. First, distributed business transactions are monitored over a plurality of machines and at least one network at step 210. Multiple agents may be used to monitor the distributed business transaction. Application agents may be used to monitor applications that process requests and perform functions that make up the distributed business transaction. Network agents may be used to monitor one or more sockets that are used to process communications between machines as part of a distributed business transaction. More details for monitoring a distributed business transaction by an application agent are discussed with respect to the method of FIG. 3. More details for monitoring a distributed business transaction by a network agent are discussed with respect to the method of FIG. 4.

An application anomaly may be detected by an application agent at step 220. The anomaly may be determined based on a baseline established by the application agent. For example, an anomaly may be a response time for a particular call that lasts more than two or three times the standard deviation of a baseline based on past performance of the particular call.

The present technology may correlate an anomaly detected with an application with an anomaly detected in a network flow that processes the business transaction. When an application anomaly is detected at step 220, in order to correlate that information with a network flow anomaly, the network agent may be queried for a network flow anomaly by the application agent at step 230.

Upon receiving the query, the network agent may determine if it has detected an anomaly in accordance with parameters received by the application agent. In some instances, the application agent may provide parameters to the network agent specifying where to identify an anomaly. For example, an application agent may indicate a particular address location for a source of a network flow and address location of for the destination of the network flow, as well as a time period over which the anomaly would have occurred. An example of a location address may include an Internet protocol address, such as an Internet protocol address for a source machine and destination machine. The network machine may then analyze the sockets being monitored to determine if any socket is associated with a source and destination address location that match those received from the application agent and if, for network flow associated with that socket, if there is an anomaly detected for the network flow during the specified period of time.

If an anomaly is detected by the network agent between the source and destination location addresses for the specified period of time agent, the network flow anomaly data is provided to the application agent by the network agent at step 240. The network flow anomaly data may include TCP statistics, latency, throughput, relay transmission, and other TCP data associated with the particular network flow. The network data reported by the application agent may also include a tuple of the source IP, destination IP, source port, and destination port associated with the network flow.

The application agent receives the network flow anomaly data from the network agent, may associate that data with business transaction information, and transmits application anomaly and network flow anomaly data to a controller at step 250. Associating the network flow anomaly data with the business transaction may include adding business transaction context information such as a business transaction identifier, tier identification for tiers involved in the network flow, node identification information for nodes involved in the flow, and the portion of the business transaction being executed over the particular network flow.

A controller receives the application anomaly and network flow anomaly data from a plurality of agents on a plurality of machines at step 260. Hence, the data transmitted by the application agent at step 250 may be one of several agents that are transmitting data to a controller. The controller correlates the received data into business transaction data and reports the business transaction data with application and/or network anomaly data at step 270.

Correlating the data may include stitching portions of data received from different agents into groups of data associated with a particular business transaction. The correlation may be performed using Internet protocol address information, call chain data, business transaction identification information, and other data. The reporting of the data may involve providing one or more call graphs, snapshots of anomaly information, and other data. Correlating received data and reporting business transaction data by a controller is discussed in more detail below with respect to the method of FIG. 5.

Figure 3:
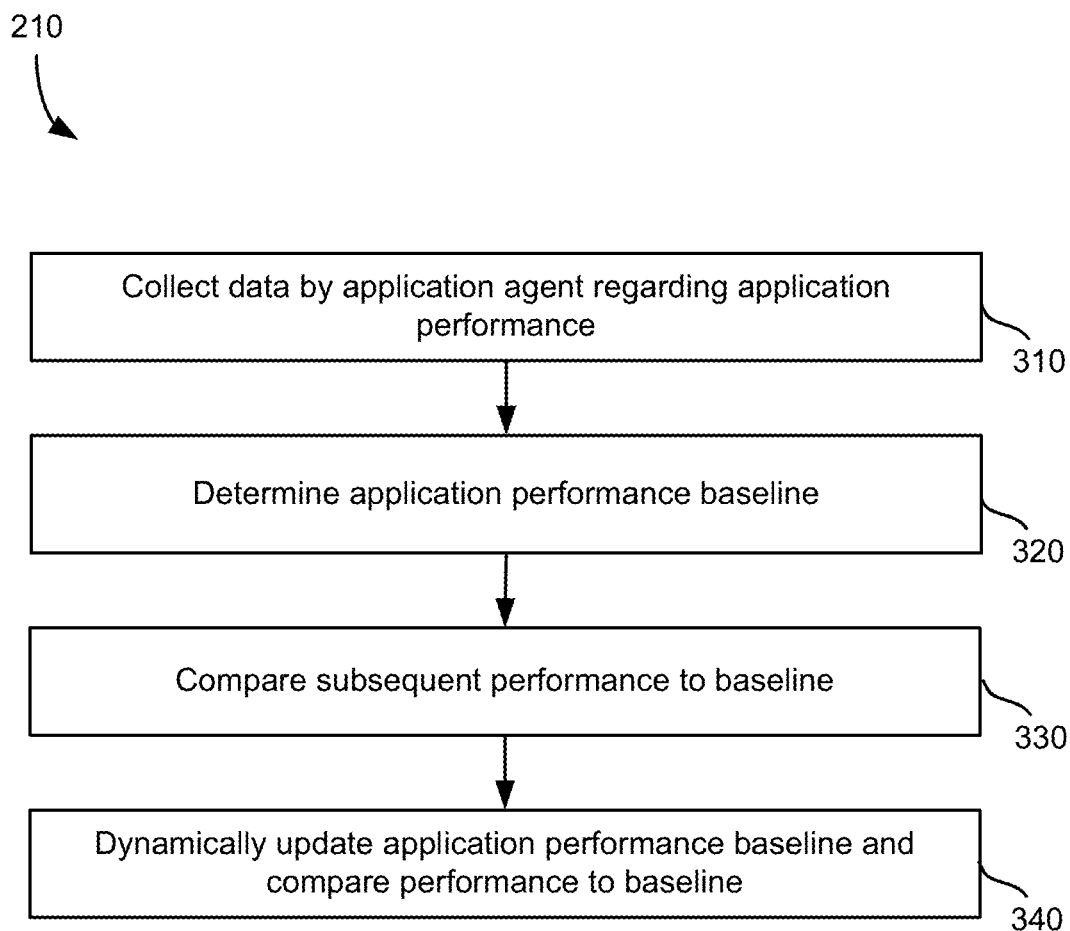
FIG. 3 is a method for monitoring distributed business transactions by an application agent.

FIG. 3 is a method for monitoring distributed business transactions by an application agent. The method of FIG. 3 provides more detail for step 210 of the method of FIG. 2. First, data is collected by an application agent regarding application performance at step 310. An application performance baseline is then determined at step 320. The baseline for an application may be determined by taking a moving average window of the response time as well as other metrics associated with a particular application, call, requests, or other function or element being monitored. Subsequent performance of the particular element or application is then compared to the baseline at step 330. As application execution continues, the application performance baseline is dynamically updated with the moving average window and compared to the performance baseline at step 340. As discussed with respect to the method of FIG. 2, if a detected value for the application performance, such as response time for a particular call, exceeds a standard deviation of the baseline by two times, three times, or some other value determined by a system designer, that value is identified as an anomaly.

Figure 4:
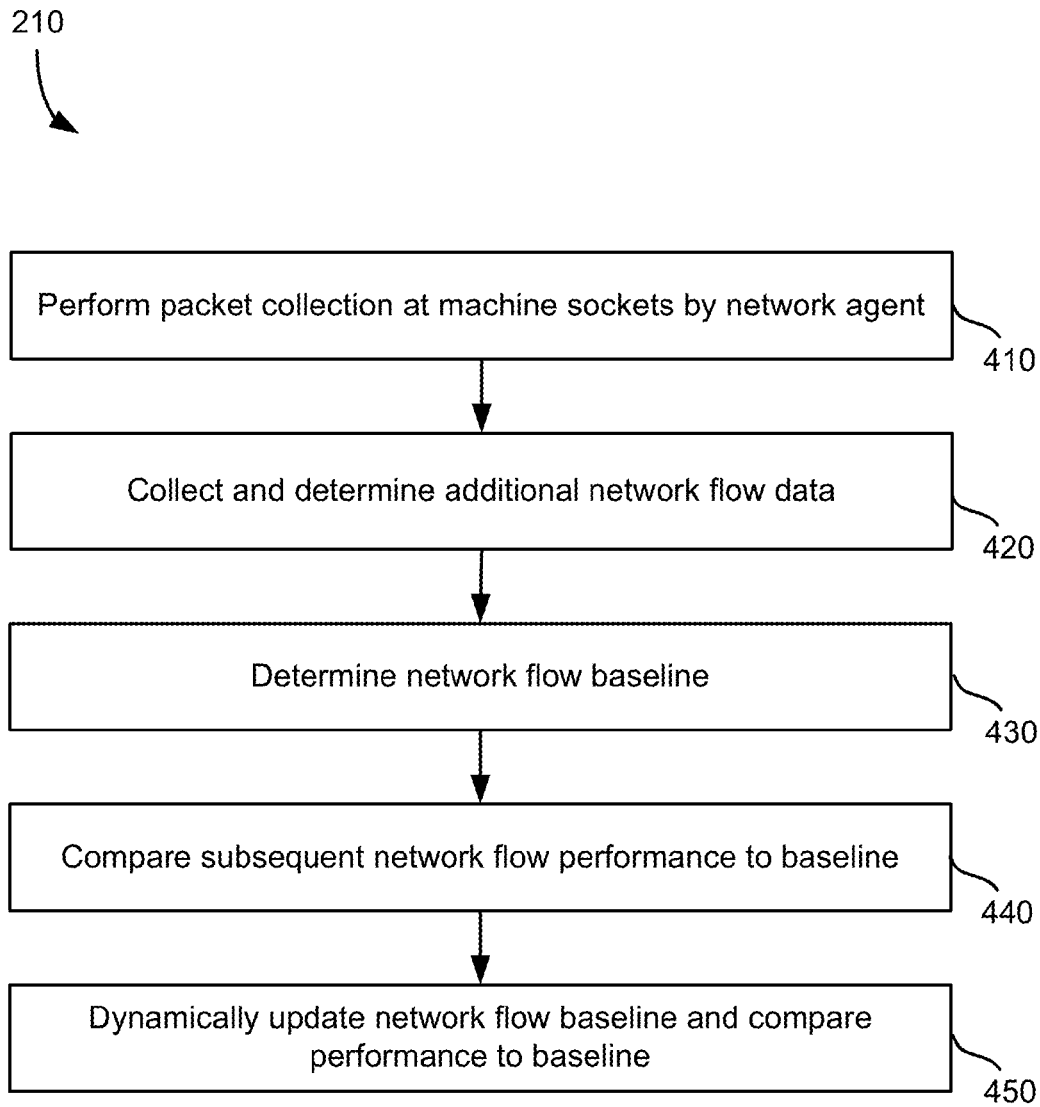
FIG. 4 is a method for monitoring distributed business transactions by network agent.

FIG. 4 is a method for monitoring distributed business transactions by network agent. The method of FIG. 4 provides more detail for step 210 of the method of FIG. 2. First, packet collection is performed at machine sockets by network agent at step 410. In addition to collecting packets, additional network flow data is collected and determined at step 420. The additional data may include TCP header data, IP sequence numbers, TCP control flags and data, acknowledgment information, and other data. The additional network flow data may also include tuples for each socket, such as a source IP, destination IP, source port and destination port for each socket. The latency, throughput and relay transmission data is determined for each network flow. A network flow baseline is then determined for each network flow metric at step 430.

Subsequent network flow performance is then compared to the baseline at step 440. As with the application metrics with respect to FIG. 4, if network flow metric values exceed two times or three times a baseline, the particular metric is identified as an anomaly. The network flow baseline is dynamically updated and subsequent performance is compared to the dynamically updated baseline at step 450.

Figure 5:
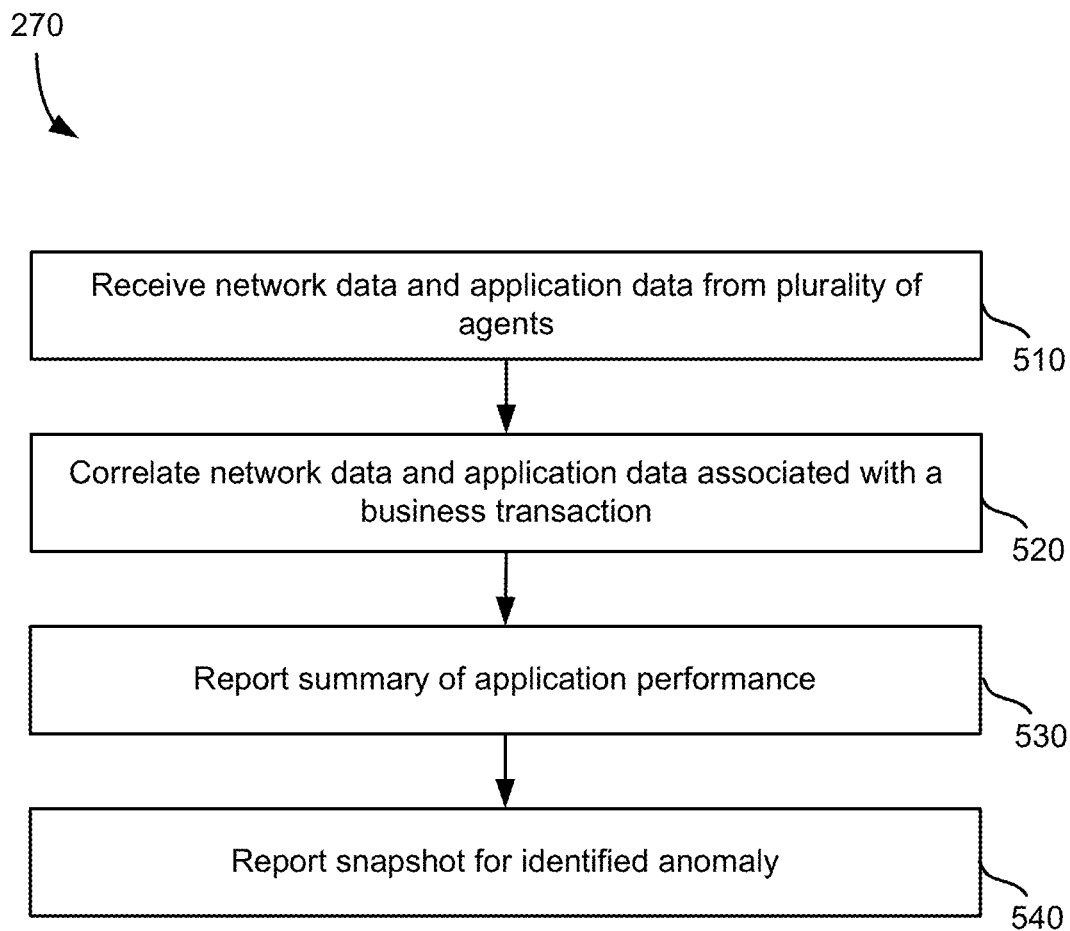
FIG. 5 is a method for processing and reporting business transaction data by controller.

FIG. 5 is a method for processing and reporting business transaction data by controller. The method of FIG. 5 provides more detail for step 270 of the method of FIG. 2. First, a controller receives network data and application data from a plurality of agents at step 510. The data may be received periodically from agents from multiple machines, or in response to an event such as detection of an anomaly.

Network data and application data associated with a business transaction may be correlated together at step 520. Correlating network data and application data by the controller results in forming groups of data associated with a business transaction. The data may be correlated together using portions of data within snapshots and/or other data provided by the application agents and network agents to the controller. For example, the data provided by the network agent (for instance, submitted by the application agent on behalf of the network agent) may include IP addresses associated with a source machine and destination machine utilizing a particular network flow. Application data provided by an application agent may also include a source address and destination address data collected by an application agent and associated with a particular business transaction. As a result, the controller may stitch together the network data to the corresponding application data based on the matching IP address data and the corresponding time at which the applications took place. Additionally, when network flow data is transmitted to the controller by an application agent, the application agent may insert business transaction identification information into the network data. The controller may then associate application data and network data based on the business transaction identification information data in both sets of data.

A summary of the application performance is provided at step 530. In some instances, the summary may be provided in one of several formats. One example of a summary of the application performance can be provided in the form of a call graph. An example of a call graph is illustrated in FIG. 6.

Figure 7:
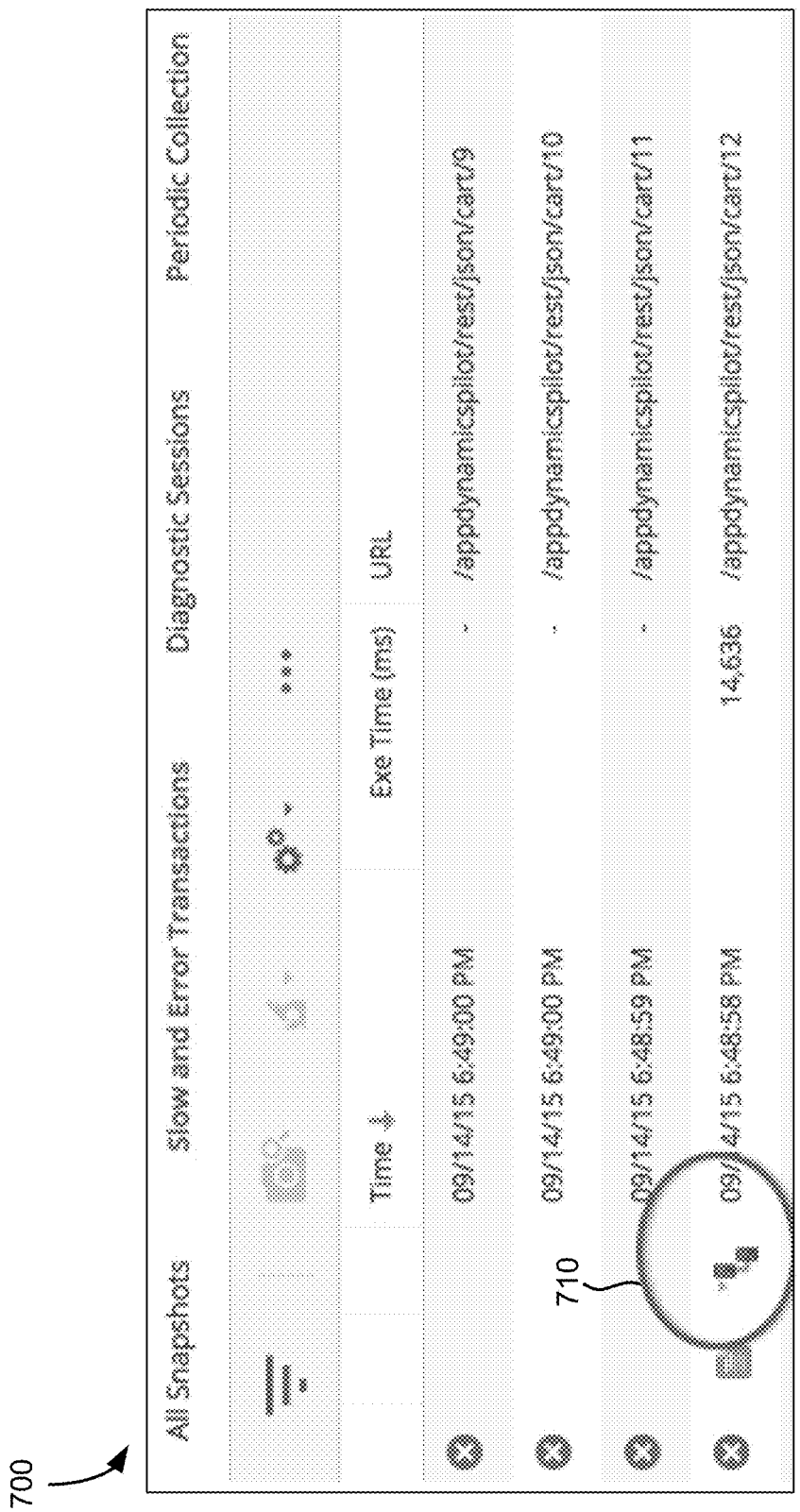
FIG. 7 is an illustration of a graphical user interface for reporting anomaly snapshot.

Snapshots for an identified anomaly may be reported at step 540. The snapshots may illustrate information for particular transactions that are slow or have other issues. Additionally, a snapshot may provide detailed information for a particular business transaction occurring over a particular network flow. An example of a list of anomalies associate with a business transaction is illustrated in the snapshot of FIG. 7. An example of a snapshot illustrating a network anomaly is illustrated in FIG. 8.

Figure 6:
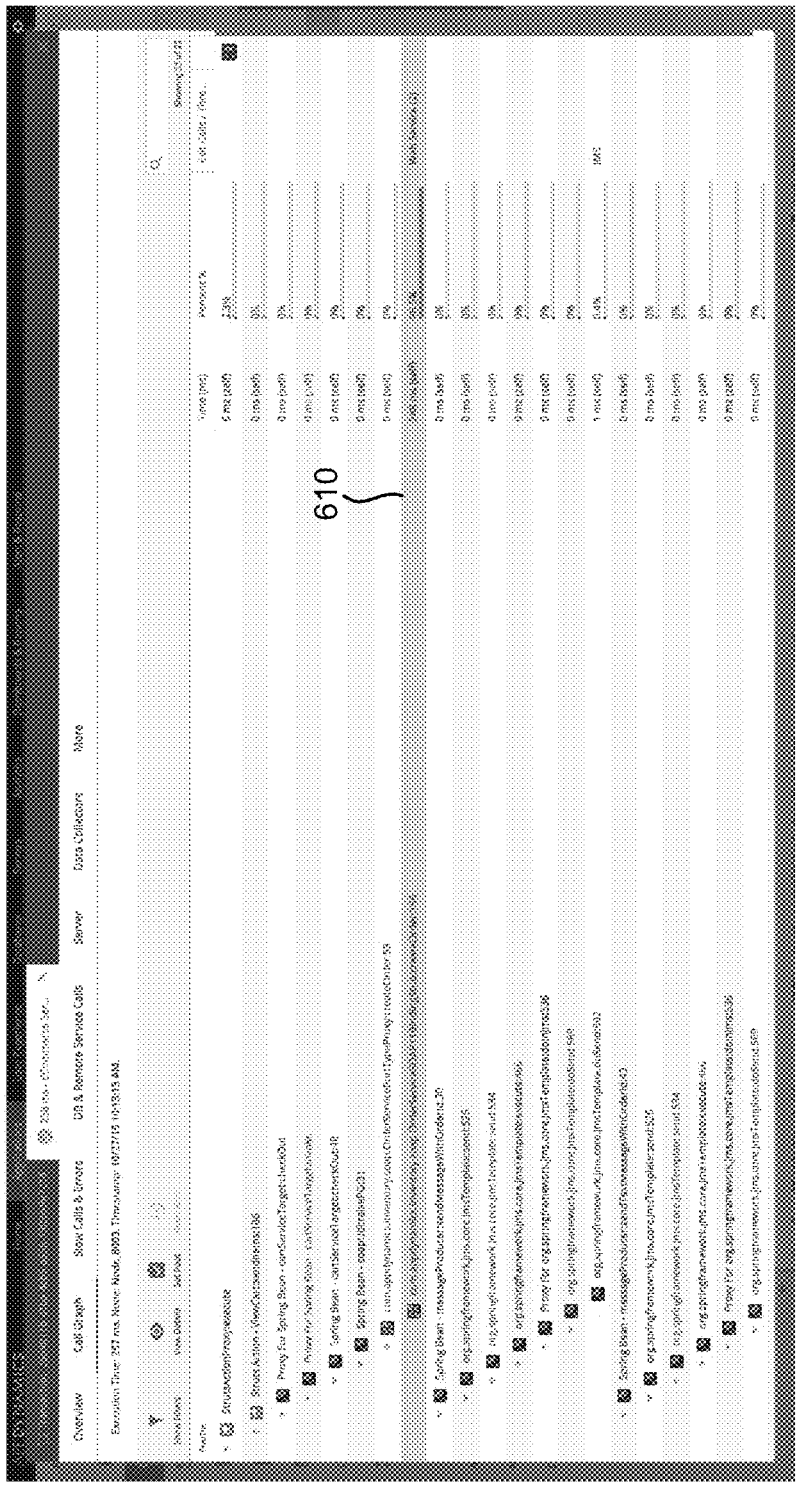
FIG. 6 is an illustration of a call graph for distributed business transaction.

FIG. 6 is an illustration of a call graph for distributed business transaction. The call graph 600 of FIG. 6 provides a hierarchical view of each application call performed as part of a business transaction. As illustrated, an application call that stands out as an anomaly is highlighted within the call graph. The anomaly 610 is highlighted by a horizontal bar within the call graph of FIG. 6. Upon selecting the highlighted method, one or more snapshot may be shown for more information.

FIG. 7 is an illustration of a graphical user interface for reporting anomaly snapshot information. Interface of FIG. 7 provides a list of slow and error transactions associated with a particular this is transaction. As shown, there are four slow and error transactions listed in the interface of FIG. 7. The last of the slow an error transactions, transaction 710, includes and identifier indicating that it is associated with a network anomaly. Upon selecting the icon associated with the network anomaly, a snapshot may be provided with more information for the particular network flow anomaly.

Figure 8:
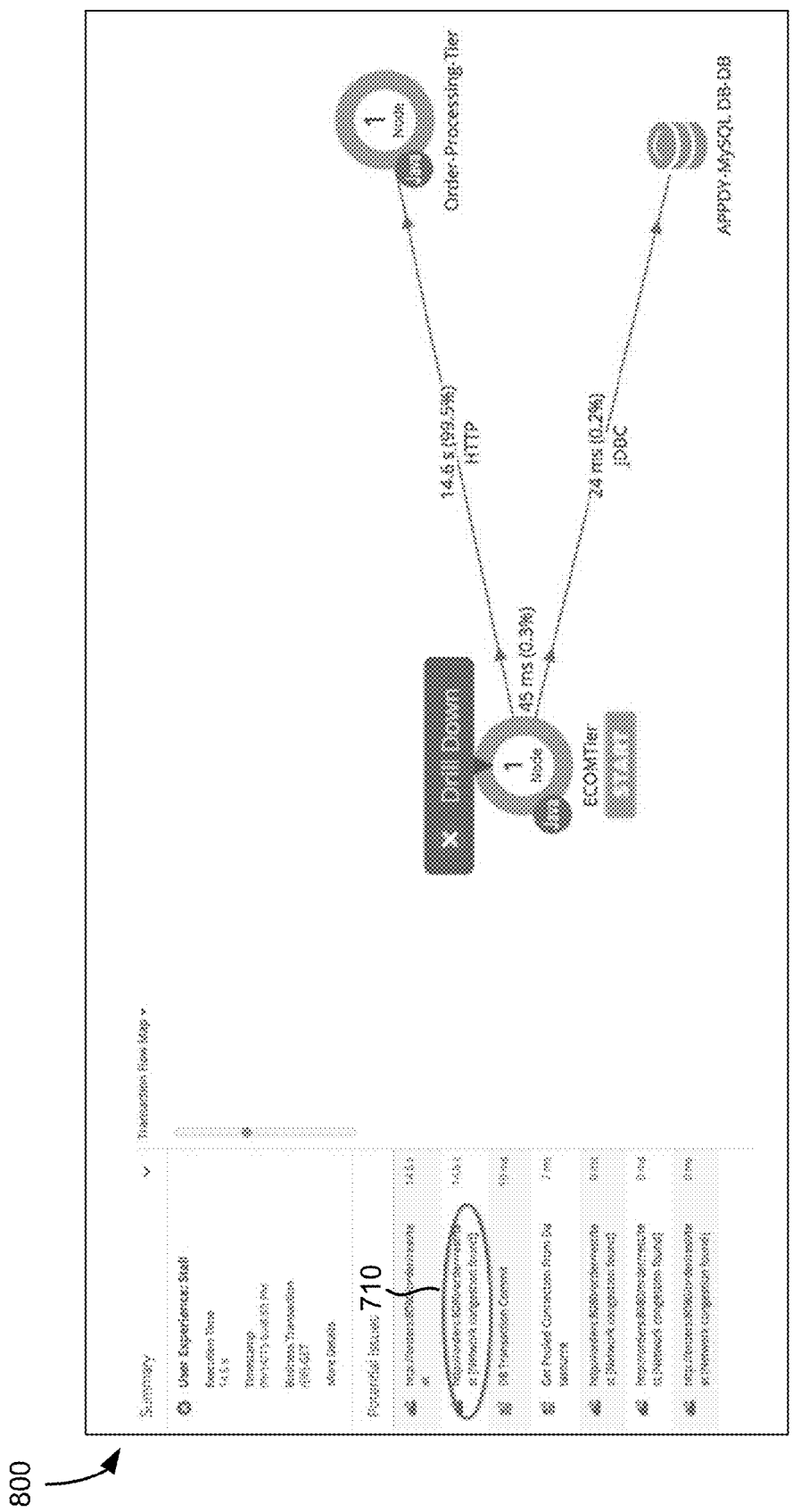
FIG. 8 is an illustration of a graphical user interface for reporting network anomaly snapshot information.

FIG. 8 is an illustration of a graphical user interface for reporting network flow anomaly snapshot information. Interface of FIG. 8 illustrates nodes associated with an anomaly and performance of the network flow between those notes. In particular, the snapshot of FIG. 8 indicates that a first portion of a network flow between a ECOMTier and an Order Processing Tier comprised 99.5% of the total time spent performing the business transaction. As such, an administrator with quickly be able to determine that the network between these two notes was the cause of the delay in the user experience, eliminating the application itself as the cause.

Figure 9:
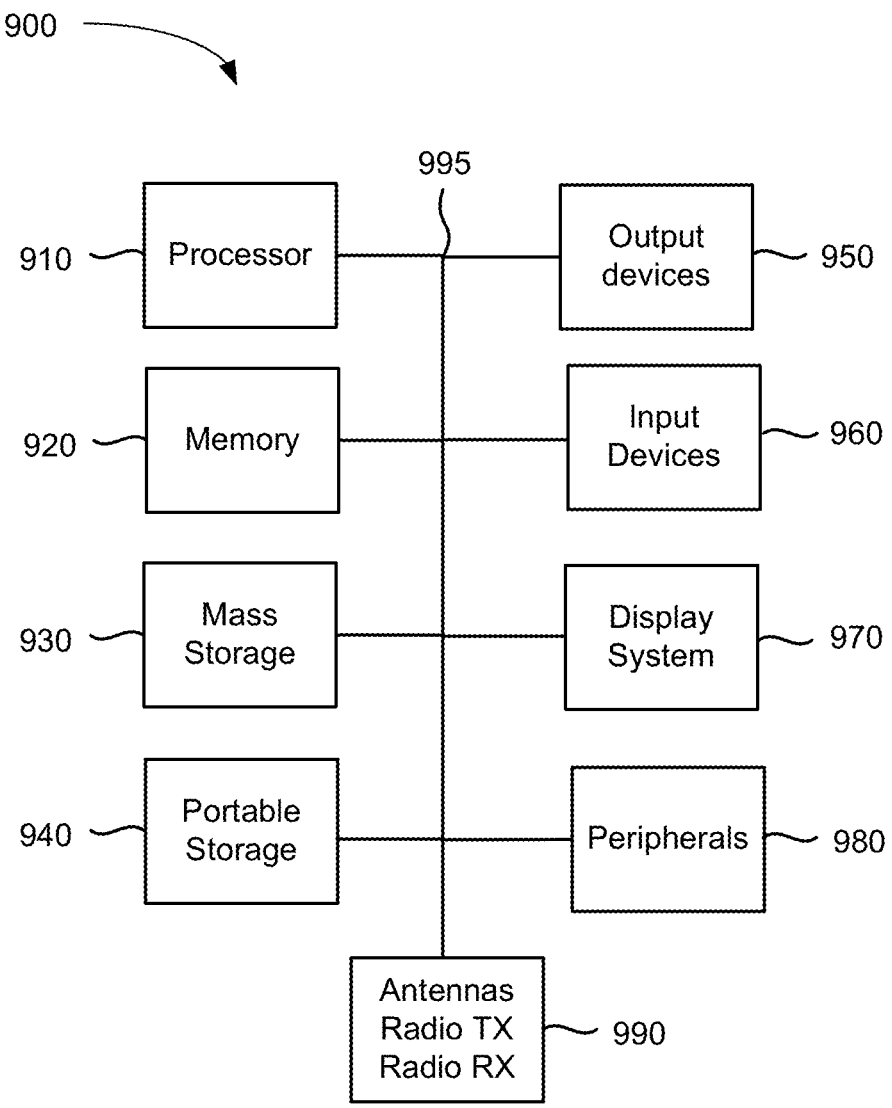
FIG. 9 is a block diagram of a computing environment for implementing the present technology.

FIG. 9 is a block diagram of a system for implementing the present technology. System 900 of FIG. 9 may be implemented in the contexts of the likes of client computer 105 and 192, servers 125, 130, 140, 150, and 160, machine 170, data stores 180 and 190, and controller 190. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive, an optical disk drive, a flash drive, or other device, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, USB drive, memory card or stick, or other portable or removable memory, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information, and processes the information for output to the display device. Display system 970 may also receive input as a touch-screen.

Peripherals 980 may include any type of computer support device to add additional functionality to the computer system. For example, peripheral device(s) 980 may include a modem or a router, printer, and other device.

The system of 900 may also include, in some implementations, antennas, radio transmitters and radio receivers 990. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a distributed business transaction over a plurality of machines and at least one network, comprising:
    monitoring, by a plurality of application agents, one or more applications that process requests and perform functions that make up the distributed business transaction to generate application data;
    monitoring, by a plurality of network agents, network sockets that are used to process communications between the plurality of machines as part of the distributed business transaction to generate network flow data;
    detecting, by one of the application agents, an application anomaly with the one or more monitored applications;
    based on the detecting of the application anomaly, querying the plurality of network agents to determine whether one of the network agents has detected a network flow anomaly associated with the monitored network sockets, wherein the querying the plurality of network agents include providing to the network agents, parameters that specify which of the monitored network sockets to analyze to identify the network flow anomaly;
    associating the detected network flow anomaly with the distributed business transaction;
    correlating the detected application anomaly and the detected network flow anomaly to identify the application anomaly as being affected by the network flow anomaly; and
    providing a snapshot displaying the correlated application anomaly and network flow anomaly associated with the distributed business transaction to indicate a relationship between the application anomaly and the network flow anomaly in the distributed business transaction.

2. The method of claim 1, wherein the application anomaly is detected based on an application performance baseline.

3. The method of claim 1, wherein the network flow anomaly is detected based on a network flow baseline.

4. The method of claim 1, wherein associating the detected network flow anomaly with the distributed business transaction includes adding business transaction context information to the detected network flow anomaly portion of the network flow data.

5. The method of claim 1, wherein monitoring the one or more applications include collecting metrics associated with performance of the one or more applications on the plurality of machines that process the distributed business transaction.

6. The method of claim 1, wherein monitoring the network flow includes capturing packets of a given network flow associated with the distributed business transaction.

7. The method of claim 1, wherein monitoring the network flow includes collecting metrics associated with performance of a given network flow between the plurality of machines that process the distributed business transaction.

8. The method of claim 1, wherein correlating the detected application anomaly and the detected network flow anomaly includes grouping the application data and the network flow data by matching the address locations in the application data and the network flow data.

9. The method of claim 1, including providing a call graph that displays the correlated application anomaly and network flow anomaly associated with the distributed business transaction.

10. A non-transitory computer readable storage medium having embodied thereon a program, the program being executable by a processor to cause operations for monitoring a business transaction, including:
    monitoring, by a plurality of application agents, one or more applications that process requests and perform functions that make up the distributed business transaction to generate application data;
    monitoring, by a plurality of network agents, network sockets that are used to process communications between the plurality of machines as part of the distributed business transaction to generate network flow data;
    detecting, by one of the application agents, an application anomaly with the one or more monitored applications;
    based on the detecting of the application anomaly, querying the plurality of network agents to determine whether one of the network agents has detected a network flow anomaly associated with the monitored network sockets, wherein the querying the plurality of network agents include providing to the network agents, parameters that specify which of the monitored network sockets to analyze to identify the network flow anomaly;
    associating the detected network flow anomaly with the distributed business transaction;
    correlating the detected application anomaly and the detected network flow anomaly to identify the application anomaly as being affected by the network flow anomaly; and
    providing a snapshot displaying the correlated application anomaly and network flow anomaly associated with the distributed business transaction to indicate a relationship between the application anomaly and the network flow anomaly in the distributed business transaction.

11. The non-transitory computer readable storage medium of claim 10, wherein the program is executable by a processor to cause operations including detecting the application anomaly based on an application performance baseline.

12. The non-transitory computer readable storage medium of claim 10, wherein the program is executable by a processor to cause operations including detecting the network flow anomaly based on a network flow baseline.

13. The non-transitory computer readable storage medium of claim 10, wherein the program is executable by a processor to cause operations including associating the detected network flow anomaly with the distributed business transaction including adding business transaction context information to the detected network flow anomaly portion of the network flow data.

14. The non-transitory computer readable storage medium of claim 10, wherein the program is executable by a processor to cause operations including correlating the detected application anomaly and the detected network flow anomaly including grouping the application data and the network flow data by matching the address locations in the application data and the network flow data.

15. The non-transitory computer readable storage medium of claim 10, wherein the program is executable by a processor to cause operations including providing a call graph that displays the correlated application anomaly and network flow anomaly associated with the distributed business transaction.

16. A system for monitoring a business transaction performed by multiple computers, comprising:
a server including a memory and a processor; and
one or more modules stored in the memory and executable by the processor to perform operations including:
monitoring, by a plurality of application agents, one or more applications that process requests and perform functions that make up the distributed business transaction to generate application data;
monitoring, by a plurality of network agents, network sockets that are used to process communications between the plurality of machines as part of the distributed business transaction to generate network flow data;
detecting, by one of the application agents, an application anomaly with the one or more monitored applications;
based on the detecting of the application anomaly, querying the plurality of network agents to determine whether one of the network agents has detected a network flow anomaly associated with the monitored network sockets, wherein the querying the plurality of network agents include providing to the network agents, parameters that specify which of the monitored network sockets to analyze to identify the network flow anomaly;
associating the detected network flow anomaly with the distributed business transaction;
correlating the detected application anomaly and the detected network flow anomaly to identify the application anomaly as being affected by the network flow anomaly; and
providing a snapshot displaying the correlated application anomaly and network flow anomaly associated with the distributed business transaction to indicate a relationship between the application anomaly and the network flow anomaly in the distributed business transaction.

17. The system of claim 16, wherein the one or more modules stored in the memory is executable by the processor to perform operations including detecting the application anomaly based on an application performance baseline.

18. The system of claim 16, wherein the one or more modules stored in the memory is executable by the processor to perform operations including detecting the network flow anomaly based on a network flow baseline.

19. The system of claim 16, wherein the one or more modules stored in the memory is executable by the processor to perform operations including associating the detected network flow anomaly with the distributed business transaction including adding business transaction context information to the detected network flow anomaly portion of the network flow data.

20. The system of claim 16, wherein the business transaction context information includes a business transaction identifier, tier identification for tiers involved in a given network flow, node identification information for nodes involved in the given network flow, or an identification of a portion of the distributed business transaction being executed over the given network flow.

21. The system of claim 16, wherein the one or more modules stored in the memory is executable by the processor to perform operations including monitoring the network flow including collecting metrics associated with performance of a given network flow between the plurality of machines that process the distributed business transaction.

22. The system of claim 16, wherein the one or more modules stored in the memory is executable by the processor to perform operations including correlating the detected application anomaly and the detected network flow anomaly including grouping the application data and the network flow data by matching the address locations in the application data and the network flow data.

23. The system of claim 16, wherein the one or more modules stored in the memory is executable by the processor to perform operations including providing a call graph that displays the correlated application anomaly and network flow anomaly associated with the distributed business transaction.

* * * * *